(12) United States Patent
Swyka et al.

(10) Patent No.: US 10,984,220 B2
(45) Date of Patent: Apr. 20, 2021

(54) METHOD AND A DEVICE FOR VERIFYING LIVENESS OF A FINGER

(71) Applicant: PRECISE BIOMETRICS AB, Lund (SE)

(72) Inventors: Timothy Swyka, Potsdam, NY (US); Peter Johnson, Potsdam, NY (US); Johan Windmark, Lund (SE); Daniel Gustafsson, Lund (SE)

(73) Assignee: PRECISE BIOMETRICS AB, Lund (SE)

( * ) Notice: Subject to any disclaimer, the term of this patent is extended or adjusted under 35 U.S.C. 154(b) by 49 days.

(21) Appl. No.: 16/443,230

(22) Filed: Jun. 17, 2019

(65) Prior Publication Data

US 2020/0394385 A1 Dec. 17, 2020

(51) Int. Cl.
*G06K 9/00* (2006.01)
(52) U.S. Cl.
CPC ..... *G06K 9/00107* (2013.01); *G06K 9/00087* (2013.01); *G06K 2009/0006* (2013.01)
(58) Field of Classification Search
CPC ........... G06K 9/00107; G06K 9/00087; G06K 2009/0006; G06K 9/0004
See application file for complete search history.

(56) References Cited

U.S. PATENT DOCUMENTS

| 10,303,921 B1 | 5/2019 | He et al. |
| 2017/0220844 A1* | 8/2017 | Jones ............... G06F 3/0421 |
| 2018/0129798 A1 | 5/2018 | He et al. |

FOREIGN PATENT DOCUMENTS

WO  WO-2017129126 A1 * 8/2017 ........... G06K 9/0004

\* cited by examiner

*Primary Examiner* — Abhishek Sarma
(74) *Attorney, Agent, or Firm* — Capitol City TechLaw (57) ABSTRACT

A method for verifying liveness of a finger of a user by capturing a first fingerprint sample from the finger placed on a display by using a first sensor placed under the display. The method may involve transmitting light, by using a first light transmitting display area of the display, towards a first area of the finger. The first light transmitting display area may be smaller than a first sensor area. The first sensor may capture reflected light from the finger. The reflected light may be transmitted through the display. A first feature of the first fingerprint sample may be identified by using the reflected light. The first feature may include scattered light from the finger. The light transmitted from the display may include a first light component with a first wavelength from a first area of the display.

11 Claims, 8 Drawing Sheets

METHOD AND A DEVICE FOR VERIFYING LIVENESS OF A FINGER

TECHNICAL FIELD

The present patent application generally relates to the field of biometric verification. More particularly, it is presented a method for verifying authenticity of a finger of a user by capturing a fingerprint sample from a finger by using a sensor placed under a display and a system thereof.

BACKGROUND ART

Today, it is common practice to use fingerprint recognition for verifying that a user of a mobile device is a legitimate user of the device. From recently launched mobile phones, it is well known to place a fingerprint sensor under the display of the mobile device for verifying the authenticity of the user. Usually, this is done by illuminating the finger with green light from the display and then reflecting the light to the sensor. By illuminating the finger with light, energy is reflected by the finger and information related to a fingerprint sample is captured. The information is compared to a fingerprint template and the fingerprint recognition is verified as a match or a non-match.

Due to that the fingerprint sensor is placed under the display, instead of being placed next to the display, there is no longer the same need to keep the fingerprint sensor small. When having the fingerprint sensor placed next to the display, the fingerprint sensor is preferably made as small as possible to provide for that as little space as possible on a front side of the mobile phone was needed to be set aside for the fingerprint sensor.

Having the fingerprint sensor placed under the display may result in that new algorithms for capturing the information related to the fingerprint sample must be developed to make sure that reliable and fast fingerprint recognition can be provided. For instance, the reflected light from the finger is to pass the display provided with light emitting elements before reaching the fingerprint sensor, which may affect the reflected light. Further, a glass as well as a protective film placed on the glass may also be provided between the finger and the fingerprint sensor, which further may affect the reflected light. In addition, to compensate for that the reflected light may be affected on its way from the finger to the fingerprint sensor in a different way than for fingerprint sensor not placed under the display, algorithms for determining liveness, i.e. whether or not the finger is real or fake, may need to be adapted.

Today when assessing liveness it is known to involves texture analysis combined by machine learning or deep learning based methods that do image and/or texture analysis classification at once.

Even if there are known solutions for placing a fingerprint sensor under the display of a mobile device, there is still a need to for methods and hardware arrangements that can ensure that the authenticity of the user is determined reliably and fast.

SUMMARY

It is an object to at least partly overcome one or more of the above-identified limitations of the prior art. In particular, it is an object to provide a method that handles different pressures more reliably and performs more secure and precise fingerprint samples.

According to a first aspect it is provided a method for verifying liveness of a finger of a user by capturing a first fingerprint sample from the finger placed on a display by using a first sensor placed under the display. The method may comprise:

transmitting light, by using a first light transmitting display area of the display, towards a first area of the finger, wherein the first light transmitting display area is smaller than a first sensor area;

capturing reflected light from the finger by the first sensor, wherein the reflected light is transmitted through the display; and identifying a first feature of the first fingerprint sample by using the reflected light, wherein the first feature comprises scattered light from the finger, wherein the light transmitted from the display comprises a first light component with a first wavelength from a first area of the display.

By using the present method, verifying liveness of a finger of a user may be performed in a more precise and secure manner. Different materials have different light scattering and therefore, by using the present method, it may be analyzed if the finger placed on the display belongs to a living person or if it is something else placed on the display.

The method may further comprise capturing a second fingerprint sample by:

transmitting light, by using a second light transmitting display area of the display, towards a second area of the finger;

capturing reflected light from the finger by the first sensor, wherein the reflected light is transmitted through the display; and identifying a first feature of the second fingerprint sample by using the reflected light, wherein the light transmitted from the display comprises a second light component with a second wavelength from a second area of the display.

The first light transmitting display area can be divided into subareas, wherein the light transmitted from the different subareas comprises different light components with different wavelengths. The second light transmitting display area can be divided into subareas, wherein the light transmitted from the different subareas comprises different light components with different wavelengths.

The step of transmitting light towards the first and/or second area of the finger may comprise determining environmental data for the user by using at least one second sensor; and adapting the light based on the environmental data.

The step of identifying the first feature of the first and/or second fingerprint sample may comprise generating a composite fingerprint sample by using the reflected light from the first and/or second light component.

The step of identifying the first feature of the first and/or second fingerprint sample may comprise generating the composite fingerprint sample by combining a plurality of generated fingerprint samples, wherein each generated fingerprint sample comprises different areas of the finger.

The method may further comprise identifying a second feature of the first and/or second fingerprint sample from the finger by using the reflected light, wherein the second feature of the first and/or second fingerprint sample is based on a second feature area of the first and/or second fingerprint sample, wherein the second feature area is a subset of a first feature area of the first and/or second fingerprint sample used for identifying the first feature of the first and/or second fingerprint sample.

The method may further comprise extracting scattered light features from the first fingerprint sample; retrieving a light scattering template; comparing the scattered light features with the light scattering template, and if a match is found, generating a liveness acceptance signal, else generating a liveness rejection signal.

The method may further comprise extracting fingerprint features from the second fingerprint sample; retrieving a fingerprint template; comparing the fingerprint features with the fingerprint template, and if a match is found, generating a fingerprint match acceptance signal, else generating a fingerprint match rejection signal.

By using the present method, fingerprint recognition may be performed in a more reliable and secure way since not only the fingerprint sample is compared to a fingerprint template but that also the scattered light is analyzed.

According to a second aspect, a mobile device configured to capture a fingerprint sample from a finger of a user is provided. The mobile device may comprise:

a display configured to transmit light towards the finger; and a first sensor placed under the display, wherein the first sensor is configured to capture reflected light from the finger according to the method according to the first aspect, wherein the reflected light is transmitted through the display.

The mobile device may further comprise at least one second sensor configured to determine environmental data for the user.

According to a third aspect it is provided a system configured to verify liveness of a finger of a user. The system may comprise:

a mobile device equipped with a display and a first sensor, wherein the first sensor is placed under the display, the mobile device is configured to:

capture a first fingerprint sample according to the first aspect;

send the first fingerprint sample to a server;

the server comprising a control unit, a transceiver, and a memory, wherein the server is configured to:

receive the first fingerprint sample;

receive a light scattering template;

execute an extraction function configured to extract scattered light features from the first fingerprint sample;

execute a comparison function configured to compare the scattered light features with the light scattering template, and if a match is found, generate a liveness acceptance signal to the mobile device, else generate a liveness rejection signal to the mobile device.

BRIEF DESCRIPTION OF THE DRAWINGS

Embodiments will now be described, by way of example, with reference to the accompanying schematic drawings, in which FIG. 1 generally illustrates a system for capturing a fingerprint sample from a finger of a user.

DETAILED DESCRIPTION

Figure 1:
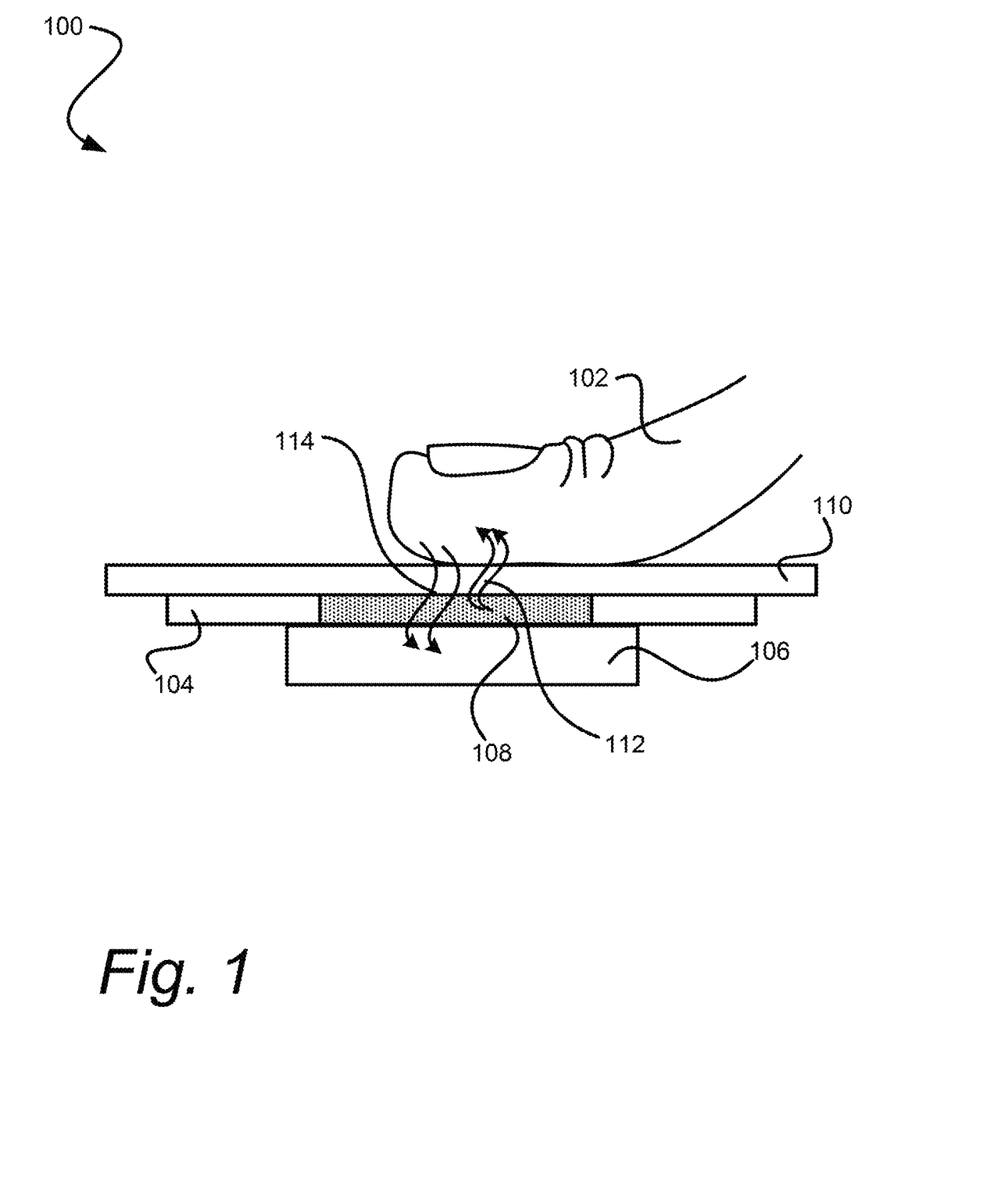

With reference to FIG. 1, an overview of a system 100 for capturing a fingerprint sample from a finger 102 of a user is illustrated by way of example. The system 100 may comprise a mobile device and a finger 102 of a user. The mobile device may be equipped with a display 104 and a first sensor 106. According to one example, the first sensor 106 may be placed under the display 104. According to another example, the first sensor 106 may be placed within the display 104.

The display 104 may be configured to transmit light 112 towards the finger 102. Upon the user placing its finger 102 on the display, a display area covered by the finger 102 may provide the transmitted light 112 towards the finger 102. The display area that may provide the transmitted light 112 is herein referred to as a light transmitting display area 108. The whole display area, or a subset of the display area, may be configured to act as the light transmitting display area 108. The area of the finger 102 that may be illuminated by the light is herein referred to as a finger area. The light transmitting display area 108 may be smaller than the finger area. Alternatively, or in combination, the light transmitting display area 108 may be larger than the finger area. Alternatively, or in combination, the light transmitting display area 108 may be equal to the finger area. In other words, the display 104 may be configured to transmit light 112 towards the total finger area, or towards a subset of the finger area, based on the size of the light transmitting display area 108.

The first sensor 106 may be configured to capture reflected light 114 from the finger 102. The reflected light 114 may be transmitted through the display 104. A total amount of the reflected light 114, or a subset of the reflected light 114, may be transmitted through the light transmitting display area 108. By way of example, the first sensor 106 may be a fingerprint sensor.

Further, the mobile device may comprise a protective glass 110. The protective glass 110 may be placed on top of the display 104. Further, the protective glass may in turn be provided with a protective film, even though not illustrated, to further reduce a risk of scratches. Both the protective glass 110 and the protective film may affect the reflected light 114. Worth mentioning is also that the protective glass 110 is in first hand optimized with respect to the display 106 such that information displayed to the user is presented in an appealing way.

Figure 2:
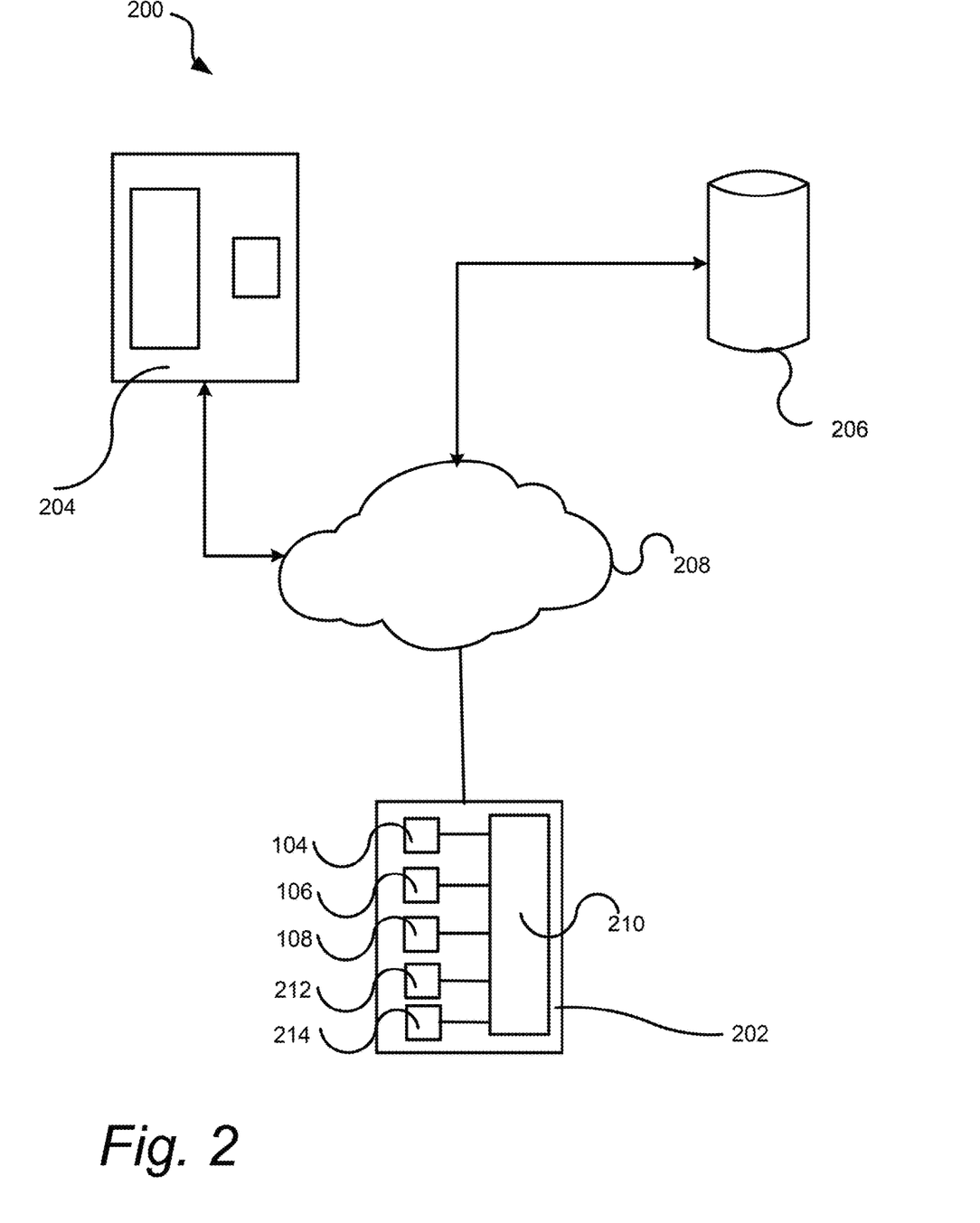
FIG. 2 illustrates a cloud computer environment.

FIG. 2 generally illustrates a cloud computer environment 200. The cloud computer environment 200 may comprise a mobile device 202, a server 204, a database 206 and a network 208.

In addition to what have been discussed above, the mobile device 202 may further comprise a processor 210 and a memory 212. The mobile device 202 may be configured to capture a fingerprint sample from a finger 102 of a user by using the first sensor 106. According to an example, the mobile device 202 may be a mobile phone. According to another example, the mobile device 202 may be a smart card. The mobile device 202 may not be limited to these examples but can be any kind of mobile device 202 configured to capture the fingerprint sample. Further, the mobile device may comprise at least a second sensor 214. By way of example, the second sensor 214 may be configured to adjust the screen brightness. By way of example, the second sensor 214 may be configured to measure the outdoor temperature.

The server 204 may be configured to store the fingerprint sample. The server 204 may be configured to receive and send information from/to the mobile device 202 and/or the database 206. Alternatively, or in combination, the database 206 may be configured to store the fingerprint sample. The database 206 may be configured to receive and send information from/to the mobile device 202 and/or the server 204. The network 208 may be configured to enabling the communication between the mobile device 202 and the server 204. Alternatively, or in combination, the network 208 may be configured to enabling the communication between the mobile device 202 and the database 206. Alternatively, or in combination, the network 208 may be configured to enabling the communication between the server 204 and the database 206.

With reference to FIG. 3A-D, a mobile device 202 equipped with a display 104 and a first sensor 106 is illustrated by way of examples. The display 104 may be configured to transmit light towards a finger 102 of a user. The display 104 may comprise a light transmitting display area 108 which is the part of the display 104 that may provide transmitted light towards the finger 102. The transmitted light from the display 104 may comprise a light component with a wavelength. The light transmitting display area 108 may be divided into subareas of the light transmitting display area 108. Different subareas may transmit the same light component towards the finger 102. Alternatively, or in combination, different subareas may transmit different light components towards the finger 102. By the term different light components, it is meant light components with different wavelengths, and hence, different energy. Upon that may be the case, different parts of the finger 102 may be illuminated by different wavelengths. Thus, the different wavelengths may penetrate differently depth into the finger 102 and based on that, different information of the finger 102 may be captured.

An advantage of using different light components with different wavelengths is that the body absorbs the energy of the different wavelengths well and different energy can penetrate into the skin at different depths. Based on the above, different and complementary information can be captured and a more efficient and precise way of capturing fingerprint samples is achieved.

The first sensor 106 may be configured to capture reflected light from the finger 102. The first sensor 106 may be placed under the display 104. The first sensor 106 may be placed within the display 104. The first sensor 106 and the light transmitting display area 108 may be fully or partly overlapping.

Figure 3A:
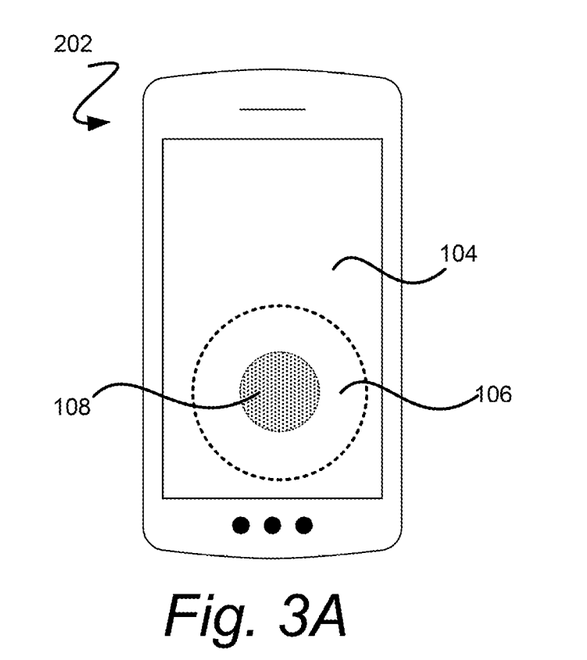
FIG. 3A-D illustrates different ratios between a first sensor and a light transmitting display area of a display.
Figure 3B:
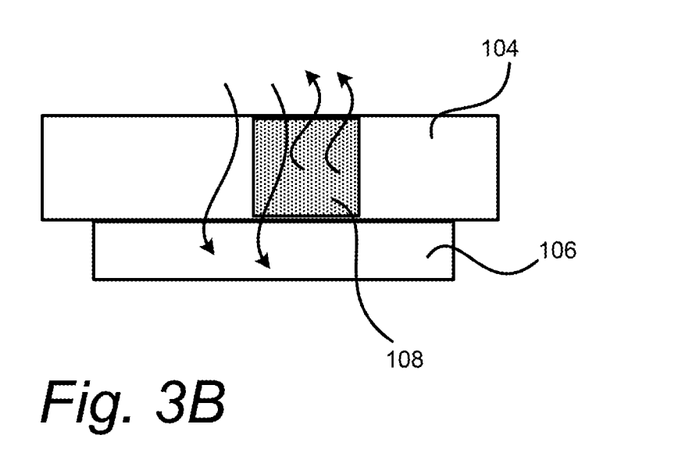

According to an example, as illustrated in FIGS. 3A and 3B, the first sensor 106 is larger than the light transmitting display area 108. The first sensor 106 and the light transmitting display area 108 are of a circular shape. Neither the first sensor 106 nor the light transmitting display area may be limited to be of the circular shape. By using this arrangement, part of the reflected light may travel through the light transmitting display area 108 to the first sensor 106 while part of the reflected light may travel beside the light transmitting display area 108, as illustrated in FIG. 3B. This arrangement may be used when a subset of the finger area may be illuminated. By using this arrangement, scattered light from the finger may be captured in the fingerprint sample. Upon comparing the scattered light with characteristics for scattered light for fingers, a liveness verification of the finger may be performed. Liveness verification may increase the security when performing fingerprint recognition. Liveness verification of the finger may be discussed more in detail in FIG. 4A-B and FIG. 7.

Figure 3C:
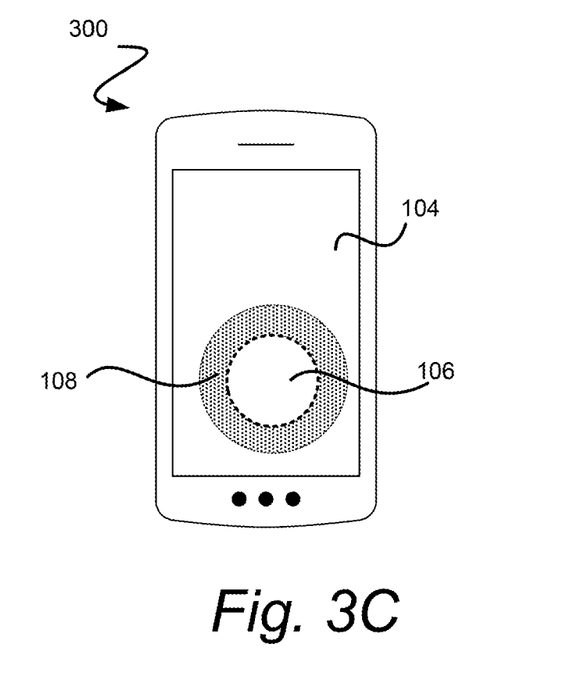
Figure 3D:
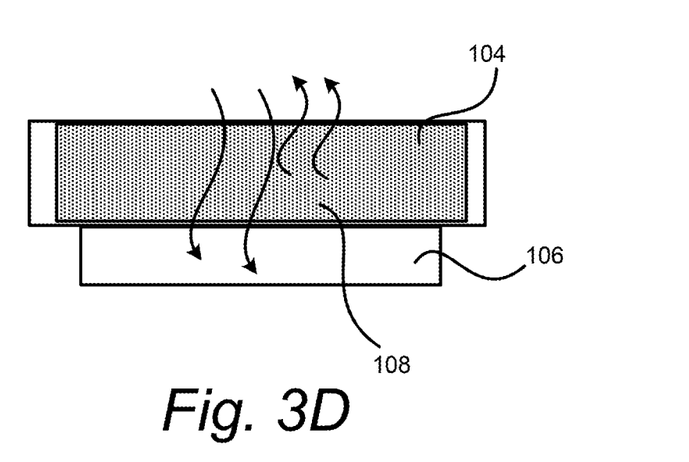

According to another example, as illustrated in FIGS. 3C and 3D, the first sensor 106 is smaller than the light transmitting display area 108. By using this arrangement, all of the reflected light may travel through the light transmitting display area 108 to the first sensor, as illustrated in FIG. 3D. This arrangement may be used when the whole finger area may be illuminated. By using this arrangement, the fingerprint from the whole finger 102 may be captured in the fingerprint sample.

Different ratios between the first sensor 106 and the light transmitting display area 108 may provide different and complementary information about the fingerprint sample. Alternatively, or in combination, this may provide different and complementary information about the ridges and/or valleys and/or swirls of the finger. Capturing different fingerprint samples by using different ratios between the first sensor 106 and the light transmitting display area 108 and/or different light components may provide a constitutive fingerprint sample comprising all information in one sample.

Figure 4A:
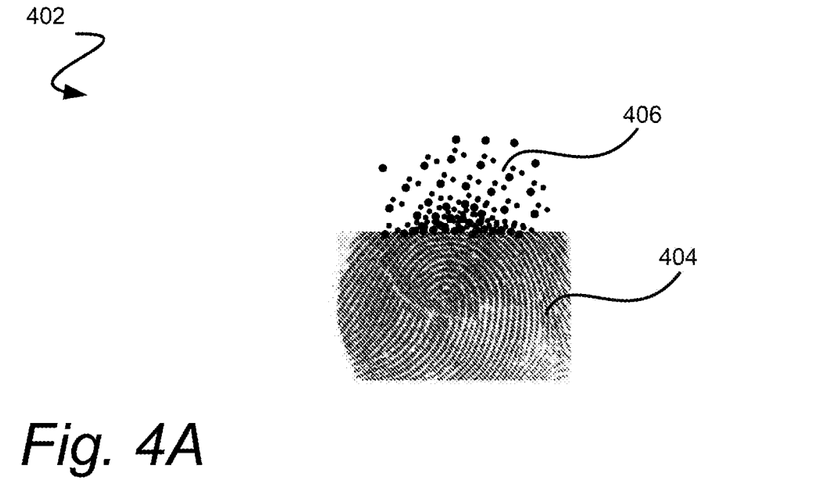
FIG. 4A-B generally illustrates a first and a second fingerprint sample.
Figure 4B:
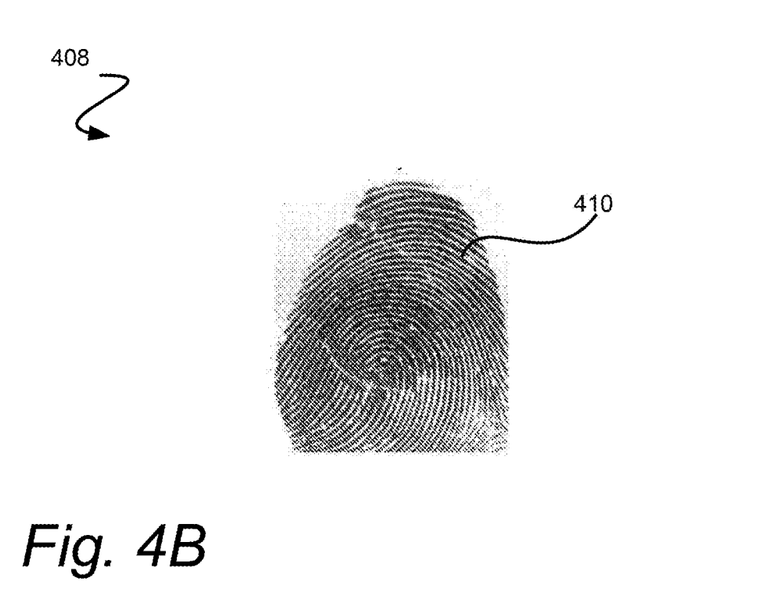

With reference to FIG. 4A-B, a first and a second fingerprint sample 402, 408 is illustrated by way of example.

According to the first fingerprint sample 402, only part of the finger 102 may have been illuminated by the light. The first fingerprint sample 402 may have a first fingerprint area. The first fingerprint sample 402 may comprise a first fingerprint 404 and scattered light 406 from the finger. The light may scatter differently depending on the material the light is transmitting to and reflected from. By way of example, if a piece of spoof-material is placed on the display instead of a real finger, then the scattered light may occur in a different manner in the fingerprint sample 402 as compared to a real finger being placed on the display. By way of example, the spoof-material can be modeling clay, glue or paper. The spoof-material is not limited to these examples but can be any material used for creating fake fingerprints. By analyzing the scattered light 406 of the fingerprint sample, the authenticity of the liveness of the finger may be analyzed. By way of example, the scattered light may be compared to a light scattering template. The light scattering template may comprise information about how different light, with different wavelength, may behave in the finger 102. The light scattering template may comprise information about how different light, with different wavelength, may behave in the spoof-material. If the comparison may be a match, the first fingerprint sample 402 may be a valid finger. Therefore, unlike today when machine learning or deep learning is used, may this solution, for verifying liveness of the finger, contribute to a more secure verification.

According to the second fingerprint sample 408, the whole finger may have been illuminated by the light. The second fingerprint sample 408 may have a second fingerprint area. The first fingerprint area may be a subset of the second fingerprint area. The second fingerprint sample 408 may comprise a second fingerprint 410. The first and second fingerprint samples 402, 408 may be illuminated by the same light component. Alternatively, or in combination, the first and second fingerprint samples 402, 408 may be illuminated by different light components with different wavelengths.

Figure 5:
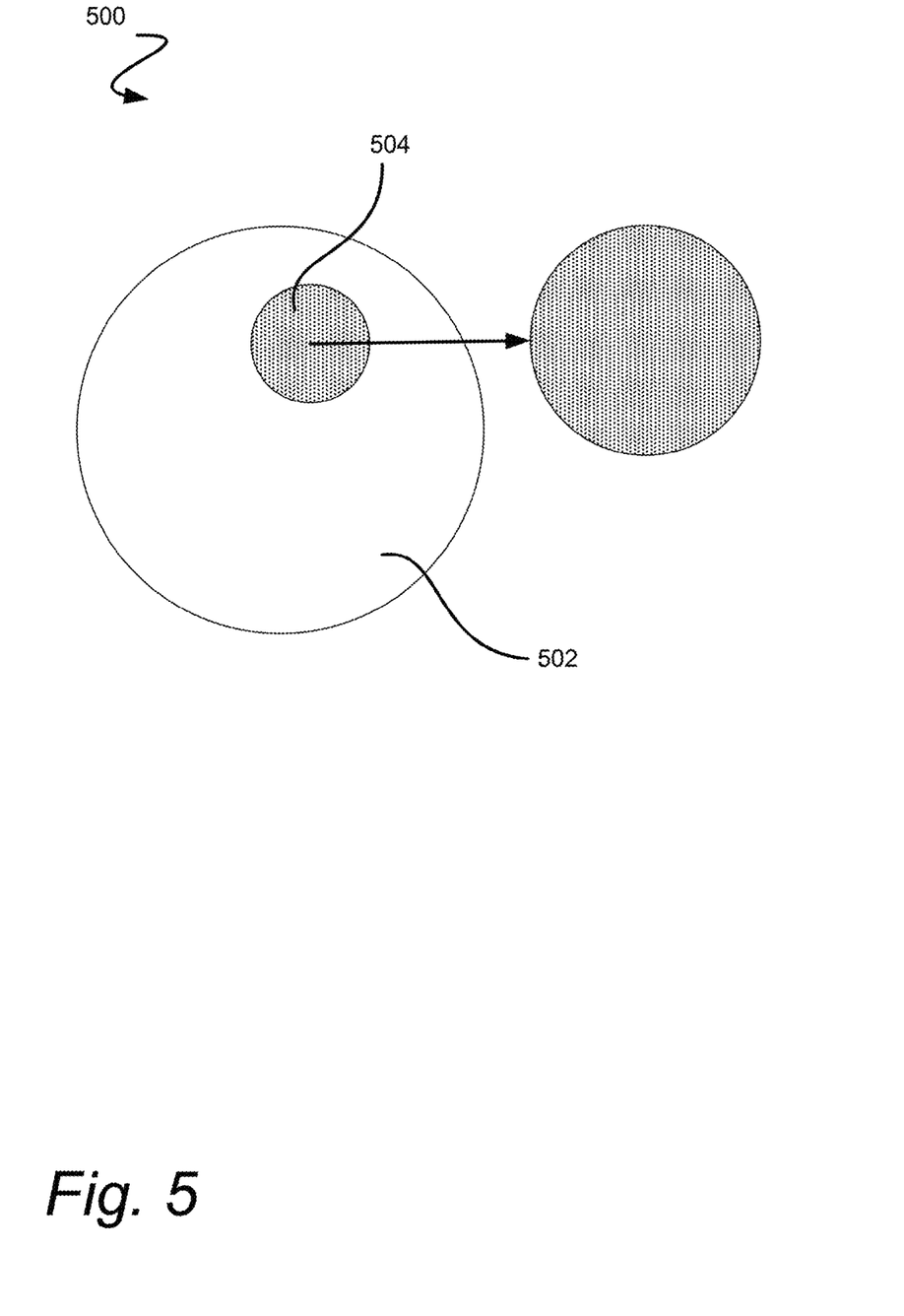
FIG. 5 generally illustrates a first and a second feature area of a fingerprint sample.

FIG. 5 generally illustrates a fingerprint sample 500 from a finger 102 of a user. By way of example, the fingerprint sample 500 may be in line with the first or second fingerprint sample 402, 408 illustrated in FIG. 4A-B. The fingerprint sample 500 may comprise a first feature area 502 and a second feature area 504. The second feature area 504 may be a subset of the first feature area 502. The first feature area 502 may comprise first feature of the fingerprint sample 500. The second feature area 504 may comprise second feature of the fingerprint sample 500. The second feature may be a subset of the first feature.

The second feature area 504 may comprise information that may need to be further analyzed. The second feature area 504 may comprise information that may be characteristic for a specific user. The system for capturing a fingerprint sample discussed above may "learn the user" over time. The term learn the user should be interpreted as the system knowing where the characteristics for the specific user may be found in the fingerprint sample. Upon that being the case, the system may only capture spot-checks of the fingerprint sample to verify the user.

Figure 6A:
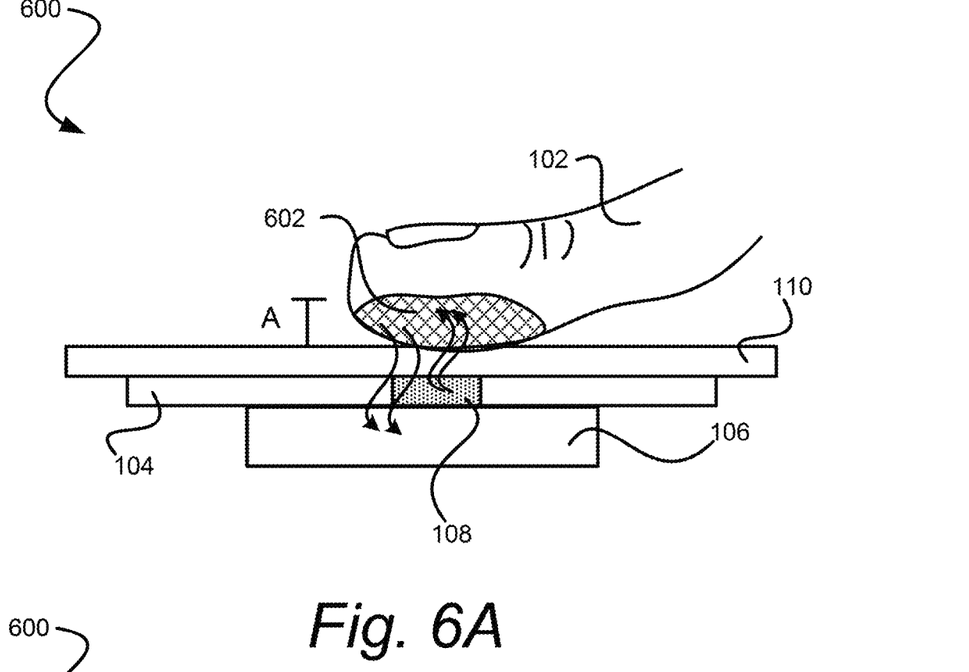
FIG. 6A-B generally illustrates capturing a fingerprint sample, wherein the finger is pressed against the display with different pressure.
Figure 6B:
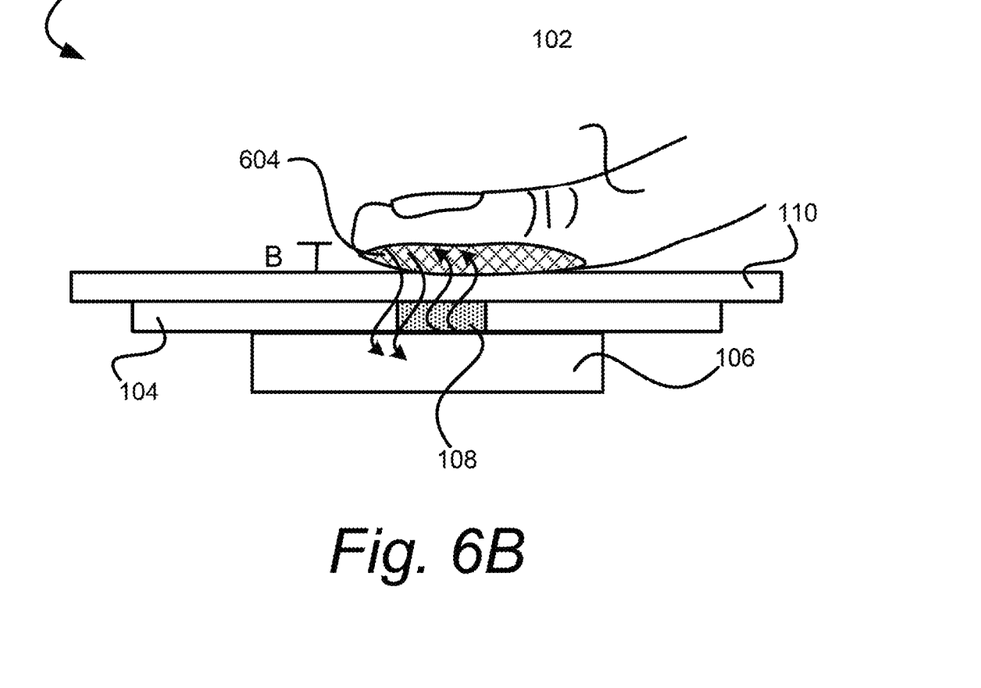

FIG. 6A-B generally illustrates a system 600 for capturing a fingerprint sample. The system 600 is in line with the system 100 discussed in FIG. 1.

In FIG. 6A, it is illustrated a finger 102 placed on the display 104 with a pressure X. In FIG. 6B, it is illustrated the finger 102 placed on the display 104 with a pressure Y. Herein, the pressure X is smaller than the pressure Y. As a consequence, the height of the finger 102 illustrated in FIG. 6A is larger than the height of the finger 102 illustrated in FIG. 6B. The height of the finger 102 illustrated in FIG. 6A is A and the height of the finger 102 illustrated in FIG. 6B is B, thus, A is larger than B.

Upon the user pressing the finger 102 against the display with a higher pressure, the density may be higher as well. As a consequence, the energy, of the transmitted light, penetrating into the finger 102 may penetrate deeper upon the density being higher.

Thus, the transmitted light may penetrate into the finger 102 to a different depth based on the pressure from the finger 102 the user may put against the display.

Upon the light penetrating to different depths into the finger 102, different information about the finger 102 may be captured.

Figure 7:
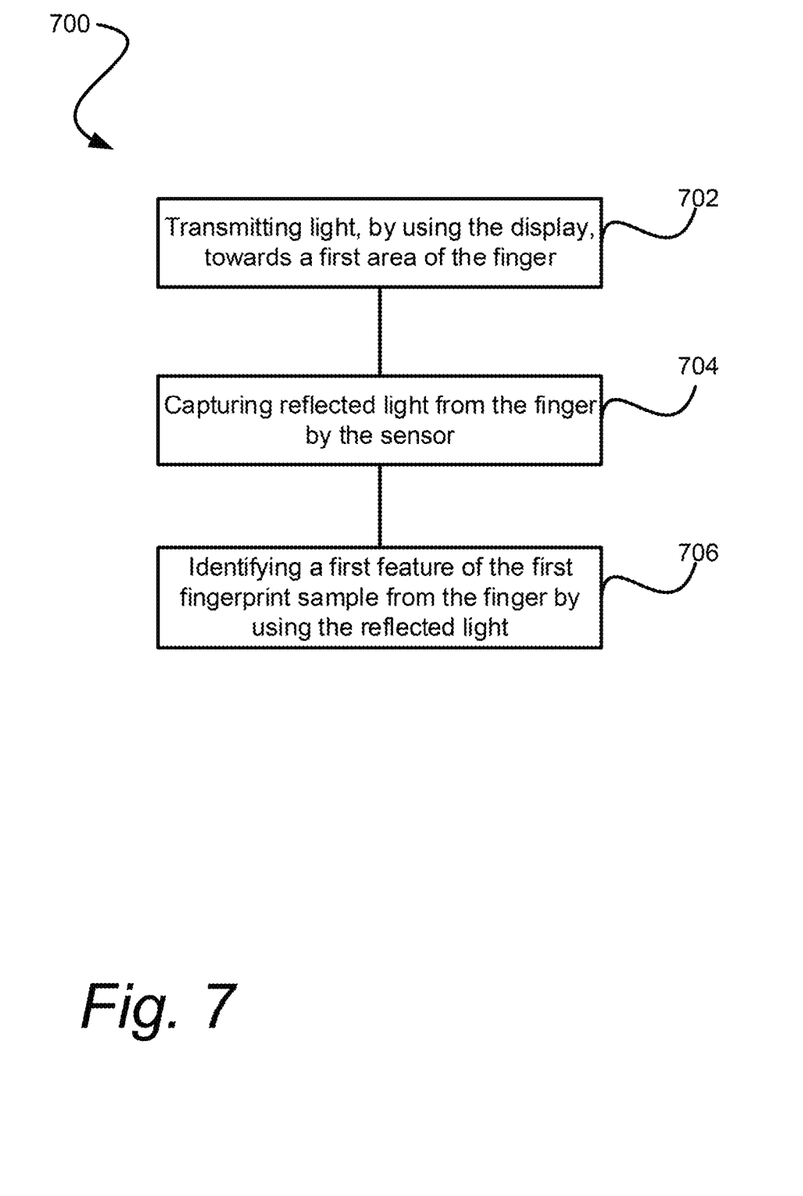
FIG. 7 illustrates a flow chart for verifying liveness of a finger of a user.

FIG. 7 is a flow chart generally illustrating an example of a method 700 for verifying authenticity of a finger of a user by capturing a first fingerprint sample 402 from the finger 102. The first fingerprint sample 402 may be captured by using a first sensor 106 placed under a display 104, wherein the user may place the finger 102 on the display 104. The method 700 comprises the following steps.

First, transmitting 702 light, by using a light transmitting display area 108 of the display 104, towards a first area of the finger 102. The light transmitting display area 108 may be smaller than the area of the first sensor 106. The light transmitted from the display 104 may comprise a first light component with a first wavelength from a first area of the display 104.

Thereafter, capturing 704 reflected light from the finger 102 by the first sensor 106. The reflected light may be transmitted through the display 104.

Then, identifying 706 a first feature of the fingerprint sample 402 from the finger 102 by using the reflected light. The first feature of the first fingerprint sample 402 may comprise scattered light from the finger 102.

Optionally, the method 700 may comprise capturing a second fingerprint sample 408. The second fingerprint sample 408 may be captured by transmitting light, by using a second light transmitting display area of the display 104, towards a second area of the finger 102. Then, capturing reflected light from the finger 102 by the first sensor 106, wherein the reflected light is transmitted through the display 104. Thereafter, identifying a first feature of the second fingerprint sample 408 by using the reflected light. The light transmitted from the second light transmitting display area may comprise a second light component with a second wavelength from a second area of the display. The first and second light component may be the same light component with the same wavelength. Alternatively, or in combination, the first and second light component may be different light components with different wavelengths.

Further, the step of transmitting 702 light may comprise determining environmental data for the user. The environmental data may be determined by using at least one second sensor 214. Based on the environmental data, the transmitted light may be adapted.

The step of identifying 706 the first feature of the first and/or second fingerprint sample 402, 408 may comprise generating a first and/or second composite fingerprint sample by using the reflected light from the first and/or second light component. Alternatively, or in combination, the step of identifying 706 the first feature of the first and/or second fingerprint sample 402, 408 may comprise generating the first and/or second composite fingerprint sample by combining a plurality of generated fingerprint samples. Each of the generated fingerprint sample may comprise different areas of the finger.

Alternatively, or in combination, the method 700 may further comprise identifying a second feature of the first and/or second fingerprint sample 402, 408 from the finger 102 by using the reflected light. The second feature of the first and/or second fingerprint sample 402, 408 may be based on a second feature area. The second feature area may be a subset of a first feature area, wherein the first feature area may be used for identifying the first feature of the first and/or second fingerprint sample.

Alternatively, or in combination, the method 700 may further comprise extracting scattered light features from the first fingerprint sample 402. Retrieving a light scattering template. Thereafter, comparing the scattered light features with the light scattering template and if a match is found, generating a liveness acceptance signal, else generating a liveness rejection signal. The light scattering template may comprise information about how different light, with different wavelength, may behave in the finger 102. The light scattering template may comprise information about how different light, with different wavelength, may behave in different spoof-materials.

Alternatively, or in combination, the method 700 may further comprise extracting fingerprint feature from the second fingerprint sample 408. Retrieving a fingerprint template. Thereafter, comparing the fingerprint features with the fingerprint template, and if a match is found, generating a fingerprint match acceptance signal, else generating a fingerprint match rejection signal.

From the description above follows that, although various embodiments of the invention have been described and shown, the invention is not restricted thereto, but may also be embodied in other ways within the scope of the subject-matter defined in the following claims.

The invention claimed is:

1. A method for verifying liveness of a finger of a user by capturing a first fingerprint sample and a second fingerprint sample from the finger placed on a display by using a first sensor placed under the display, the method comprising:
  transmitting light, by using a first light transmitting display area of the display, towards a first area of the finger, wherein the first light transmitting display area is smaller than a first sensor area, and wherein the light transmitted from the display includes a first light component with a first wavelength from a first area of the display;
capturing reflected light from the finger by the first sensor, wherein the reflected light is transmitted through the display;
identifying a first feature of the first fingerprint sample by using the reflected light, wherein the first feature includes scattered light from the finger;
transmitting light, by using a second light transmitting display area of the display, towards a second area of the finger, wherein the light transmitted from the display includes a second light component with a second wavelength from a second area of the display;
capturing reflected light from the finger by the first sensor, wherein the reflected light is transmitted through the display; and
identifying a first feature of the second fingerprint sample by using the reflected light.

2. The method according to claim 1, wherein the first and/or the second light transmitting display area is divided into subareas, wherein the light transmitted from the different subareas includes different light components with different wavelengths.

3. The method according to claim 1, wherein the step of transmitting light towards the first and/or the second area of the finger comprises:
determining environmental data for the user by using at least one second sensor; and
adapting the light based on the environmental data.

4. The method according to claim 1, wherein the step of identifying the first feature of the first and/or the second fingerprint sample comprises generating a composite fingerprint sample by using the reflected light from the first and/or the second light component.

5. The method according to claim 1, wherein the step of identifying the first feature of the first and/or the second fingerprint sample comprises generating a composite fingerprint sample by combining a plurality of generated fingerprint samples, wherein each generated fingerprint sample comprises different areas of the finger.

6. The method according to claim 1, further comprising:
identifying a second feature of the first and/or the second fingerprint sample from the finger by using the reflected light;
wherein the second feature of the first and/or the second fingerprint sample is based on a second feature area of the first and/or the second fingerprint sample;
wherein the second feature area is a subset of a first feature area of the first and/or the second fingerprint sample used for identifying the first feature of the first and/or the second fingerprint sample.

7. The method according to claim 1, further comprising:
extracting scattered light features from the first fingerprint sample;
retrieving a light scattering template;
comparing the scattered light features with the light scattering template; and
if a match is found, generating a liveness acceptance signal, else generating a liveness rejection signal.

8. The method according to claim 1, further comprising:
extracting fingerprint features from the second fingerprint sample;
retrieving a fingerprint template;
comparing the fingerprint features with the fingerprint template; and
if a match is found, generating a fingerprint match acceptance signal, else generating a fingerprint match rejection signal.

9. A mobile device configured to capture a fingerprint sample from a finger of a user, the mobile device comprising:
a display configured to transmit light towards the finger; and
a first sensor placed under the display;
wherein the first sensor is configured to capture reflected light from the finger according to the method according to claim 1; and
wherein the reflected light is transmitted through the display.

10. The mobile device according to claim 9, further comprising:
at least one second sensor configured to determine environmental data for the user.

11. A system configured to verify liveness of a finger of a user, the system comprising:
a mobile device equipped with a display and a first sensor placed under the display, wherein the mobile device is configured to
capture a first fingerprint sample according to claim 1, and
send the first fingerprint sample to a server;
the server including a control unit, a transceiver, and a memory, wherein the server is configured to
receive the first fingerprint sample,
receive a light scattering template,
execute an extraction function configured to extract scattered light features from the first fingerprint sample,
execute a comparison function configured to compare the scattered light features with the light scattering template, and
if a match is found, generate a liveness acceptance signal to the mobile device, else generate a liveness rejection signal to the mobile device.

* * * * *